Figure 1:
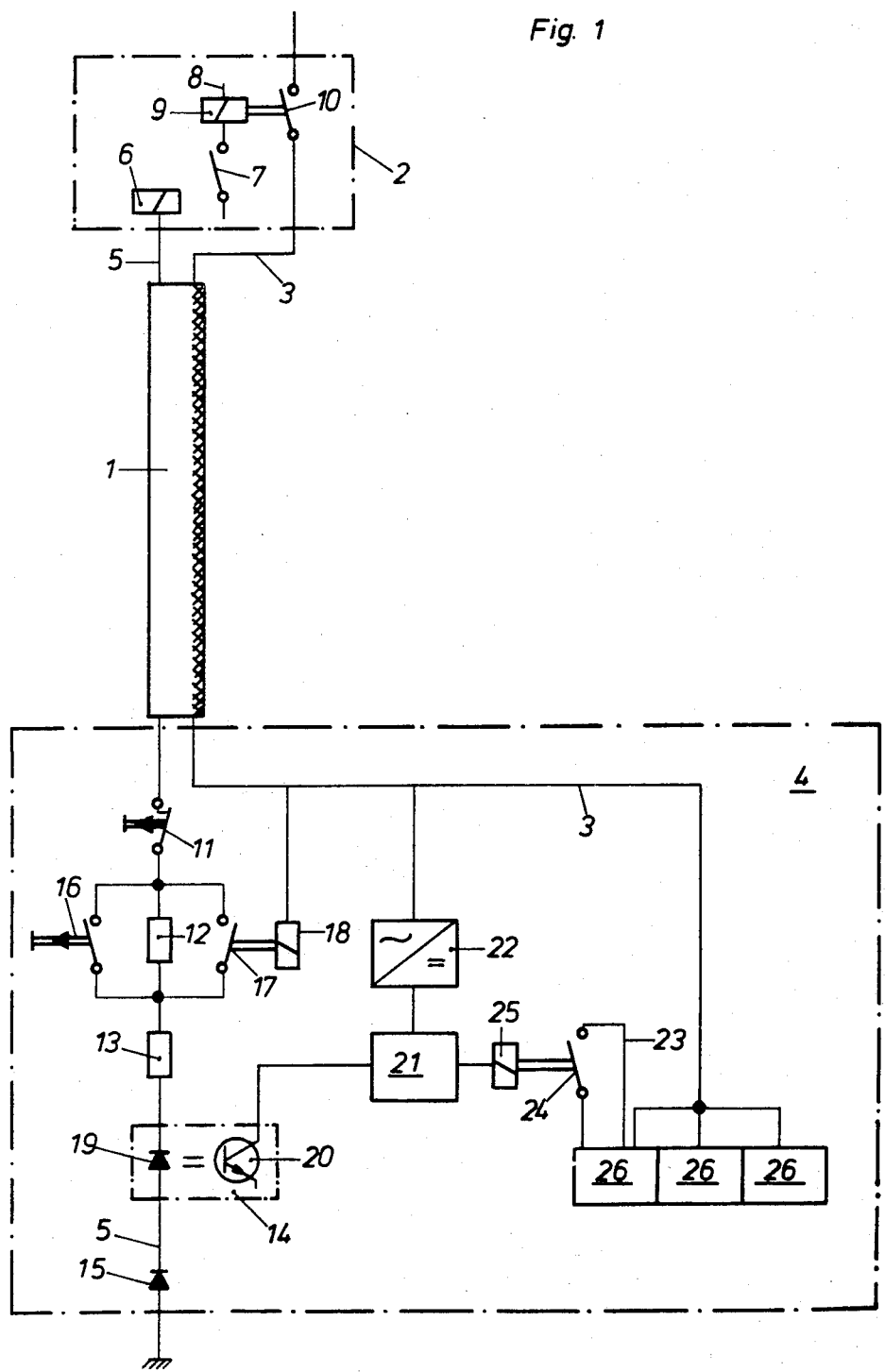

United States Patent [19]

Dinkelbach et al.

[11] 4,217,622
[45] Aug. 12, 1980

[54] CONTROL CIRCUIT FOR UNDERGROUND MINING EQUIPMENT

[75] Inventors: Anton Dinkelbach, Gelsenkirchen; Karl-Heinz Weber, Witten-Heven, both of Fed. Rep. of Germany

[73] Assignee: Gebr. Eickhoff Maschinenfabrik und Eisengiesserei m.b.H., Bochum, Fed. Rep. of Germany

[21] Appl. No.: 913,701

[22] Filed: Jun. 8, 1978

[30] Foreign Application Priority Data

Jun. 15, 1977 [DE] Fed. Rep. of Germany ....... 2726881

[51] Int. Cl.$^2$ ............................................. H02H 7/08
[52] U.S. Cl. ..................................... 361/175; 361/27; 361/106
[58] Field of Search ...................... 361/47, 48, 49, 50, 361/27, 106, 173, 175, 8, 13, 2, 23; 307/117, 115, 141, 141.4

[56] References Cited

U.S. PATENT DOCUMENTS

| 3,136,926 | 6/1964 | Smith | 361/173 |
|---|---|---|---|
| 3,196,316 | 7/1965 | Crom | 361/48 |
| 3,335,324 | 8/1967 | Buckeridge | 361/48 |
| 3,555,356 | 1/1971 | Kaiser | 361/27 |
| 3,665,251 | 5/1972 | Buckeridge | 361/48 |
| 3,771,020 | 11/1973 | Smith | 361/48 |
| 4,011,483 | 3/1977 | Meadows | 361/47 |
| 4,143,287 | 3/1979 | Biggs | 361/175 X |

Primary Examiner—Patrick R. Salce
Attorney, Agent, or Firm—Thomas H. Murray; Clifford A. Poff

[57] ABSTRACT

Mining equipment of the type operably dependent on the voltage and/or the phase of electric current is isolated from electric supply mains by an OFF switch in a control circuit before a current supply relay drops out. The OFF switch and an ON switch are coupled in a monitoring conductor which supplies current to a photo-electronic coupler. An output signal from the coupler is delivered to a battery fed integrator to provide a control signal to an output relay for a switch in the current supply line on mining equipment. The ON switch is bridged by a normally closed switch coupled to a relay which is responsive to operating current fed to the machine. In a second embodiment, thermal sensing elements for motor windings on the machine provide a signal to battery fed relays to open a normally closed switch in a circuit bridging the photo-electronic coupler.

5 Claims, 2 Drawing Figures

CONTROL CIRCUIT FOR UNDERGROUND MINING EQUIPMENT

BACKGROUND OF THE INVENTION

The invention relates to a control circuit for underground mining equipment such as a getting machine or conveyor system equipped with apparatus which is operatively dependent on the operating voltage and/or phase of electric current in a supply cable wherein such equipment is connected by a monitoring conductor to a power contactor situated in the mine gallery and to a monitoring relay.

West German patent publication No. 23 50 963 discloses means for switching ON and OFF the driving motor of getting machines, more particularly of drum cutter loaders, which are provided with a motor contactor that can be controlled by a relay and with a bridgeable ON-key switch and an OFF-key switch, both of which are connected in series with a relay.

The apparatus of getting machines and in conveyor systems include means which depend on the operating voltage and/or phase of a current supply. Such means include, for example, thyristor controlled systems which must be set into their electrically inoperative position, and more specifically, the thyristors must be extinguished when the OFF-key switch is actuated before the roadway contactor is switched OFF.

SUMMARY OF THE INVENTION

It is the object of the invention to provide a control circuit which is particularly suited to this end and isolates apparatus depending on operating voltage and/or phase of a current supply in the electric mains when the OFF-key switch of the getting machine or of the conveying system is actuated and before the roadway contactor drops out.

According to the present invention, there is provided a control circuit for voltage and/or phase dependent apparatus for underground mining equipment such as a getting machine or conveyor system wherein said mining equipment is connected through a cable to a power supply switch, monitoring conductor and monitoring relay remotely situated in the mine gallery, the control circuit including the combination of a photo-electronic coupler responsive to current in the monitoring conductor for producing an output signal, a battery fed integrator stage receiving the output signal from the photo-electronic coupler for producing a control signal, an output relay responsive to the control signal to control the apparatus, an ON switch serially coupled in the monitoring conductor between the monitoring relay and the photo-electronic coupler, a first normally open switch serially connected in the monitoring conductor to bridge the ON switch, and a first relay for closing the first normally open switch.

Thus to provide the necessary control and to attain the object of the invention, the control circuit is characterized by a photo-electronic coupler, connected within the monitoring conductor circuit, having an output connected to a battery fed integrator stage which is connected to an output relay used to control the apparatus circuit. A normally open switch bridges the ON-key switch in the monitoring conductor and is coupled to a relay which is responsive to the operating voltage of the apparatus. When the operating current flows through the monitoring conductor circuit, a light emitting diode in the photo-electronic coupler will be illuminated and, via a phototransistor and the integrator stage which follows the diode, will control the relay which applies voltage to the voltage-dependent and/or phase-dependent apparatus on the mining equipment. It is the function of the integrator stage to bridge the current intervals of the half-wave current which flows in the monitoring conductor circuit. As soon as the current in the monitoring circuit is interrupted or the monitoring circuit is connected to the earth continuity conductor and the light emitting diode of the photo-electronic coupler is therefore dead, the deenergized relay interrupts the connection between the current supply mains and the apparatus which depend on voltage and/or phase of the current supply. Such isolation always occurs before the roadway contactor drops out since, by contrast to the roadway contractor, the photo-electronic coupler operates with inertia.

Getting machines or conveying systems are sometimes controlled from the roadway, i.e., mine gallery. The state of readiness of the machine or conveyor system for switching ON is checked remotely from the roadway by means of battery fed protective devices. For example, in the case of getting machines or conveying systems in unmanned headings, it is essential that the operating state as well as the readiness for switching ON of the getting machine in the heading and where appropriate also of the conveying system is determined (prior to switching ON the getting machine or the conveyor system) from a remotely located operating stand in the roadway. To enable the control circuit according to the present invention to be utilized in this case a further embodiment is provided wherein the photo-electronic coupler is connected to the device for switching ON the battery. The photo-electronic coupler and an end element diode are bridged by a bridge circuit containing a bridge diode arranged antiparallel to the element diode, and two normally closed switches which are connected in series with the bridge diode. One normally closed switch, together with a normally open switch connected into the monitoring conductor, is actuated by a relay which is controlled by the protective devices. The other normally closed switch in the bridge circuit, together with normally closed switch which bridges the normally open switch in the monitoring conductor, is actuated by a relay controlled by the operating voltage of the apparatus. With a circuit constructed in this manner, the battery is switched ON from the roadway while bypassing the roadway contactor. The protective devices are supplied with electric energy and the readiness for switching ON or the operating state of a getting machine is checked through the use of the protective devices.

Figure 2:
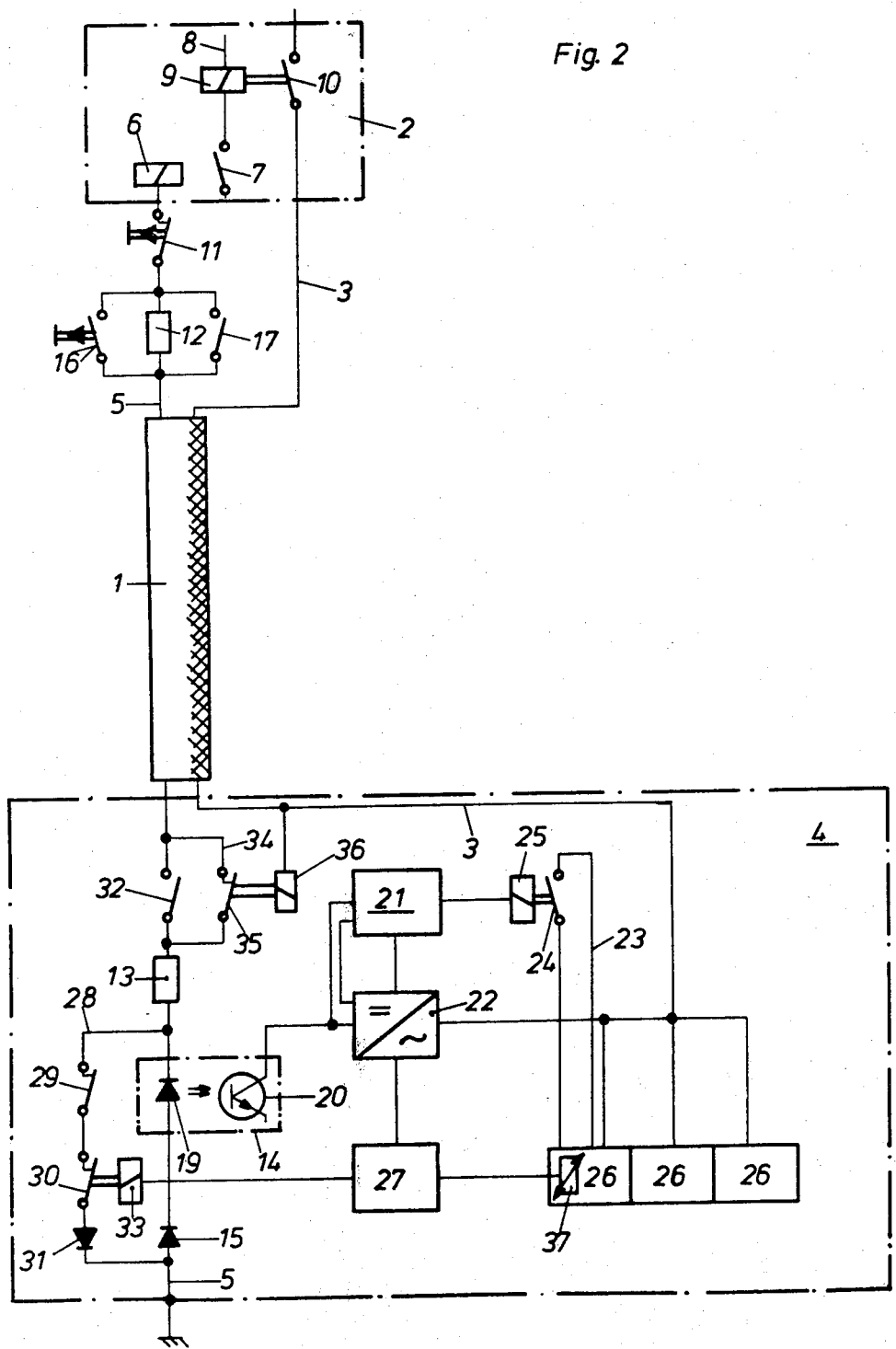

These features and advantages of the present invention as well as others will be more fully understood when the following description is read in light of the accompanying drawings, in which:

FIG. 1 is a circuit diagram of the control circuit which is actuated by the getting machine, and FIG. 2 is the circuit diagram of the control circuit which is actuated from the roadway or mine gallery.

In FIGS. 1 and 2, reference numeral 1 denotes the drum cutter cable of a drum cutter mining machine. Cable 1 supplies electrical energy from the roadway contactor or remote control 2 via conductor 3 to a drum cutter mining machine or getting machine 4 while situated in the heading of the mine. Within the drum cutter cable 1 there is also disposed the monitoring conductor 5 which is connected in the region of the roadway remote control 2 to a monitoring relay 6 which actuates, via a normally open switch 7, a relay 9. Relay 9 is connected in the line 8 and associated with the roadway remote control 2. Relay 9 actuates the normally closed switch 10 in the conductor 3 to supply voltage to the getting machine 4. The terms "normally open switch" and "normally closed switch" are defined to mean relatively movable electrical contacts and their normal relative position.

In FIG. 1, the monitoring conductor 5 connects the monitoring relay 6 of the roadway remote control to the OFF-key switch 11 disposed on the getting machine 4. Resistors 12 and 13 are connected in series with the OFF-key switch 11. Current is fed from resistor 13 by conductor 5 to a photo-electronic coupler 14 and thence to the semiconductor diode 15 forming the final element in conductor 5. The resistor 12 is bridged on the one hand by the ON-key switch 16 disposed on the getting machine 4 and on the other hand by a normally open switch 17. Switch 17 is actuated by a relay 18 controlled by the operating current in conductor 3. A light emitting diode 19 associated with the photo-electronic coupler 14 is energized by the current in line 5. Emissions of light from diode 19 occur at the rhythm of the half-waves of the alternating current which flows in the monitoring conductor 5 and are converted by a phototransistor 20 in the photo-electronic coupler into output signals. The intervals of rhythmic output signals are bridged by means of an integrator 21 to form a control signal. A battery 22, connected to the conductor 3, supplies the integrator 21 with the energy required for its operation. The control signal from integrator 21 corresponds to the output signal of the photo-electronic coupler 14 and applies voltage to a relay 25 which controls the apparatus circuit 23 via the normally open switch 24. The circuit 23 of the apparatus 26 is closed by the relay operated switch 24. The relay 18 will then also be energized by the conductor 3 to which voltage will then have been applied. Relay 18 operates the normally open switch 17 and closes the monitoring conductor circuit 5 during the make period of the ON-key switch 16.

If the monitoring conductor 5 is interrupted, for instance by actuation of the OFF-key switch 11, or if the conductor 5 is deenergized in some other manner, the photo-electronic coupler 14 will not deliver an output signal because the light emission by the light emitting diode 19 will instantly cease. Accordingly, the relay 25 drops out and interrupts the apparatus circuit 23. Since the photo-electronic coupler 14 operates without inertia, by contrast to the roadway remote control 2, it will always interrupt the apparatus circuit 23 prior to the dropping out of the roadway remote control 2 whenever the OFF-key switch 11 is actuated.

In the embodiment of the circuit illustrated in FIG. 1, the OFF-key switch 11 and the ON-key switch 16 are situated on the getting machine 4. In the embodiment of the circuit illustrated in FIG. 2, the ON-key switch 16 and the OFF-key switch 11 are situated in the region of the roadway, not shown, closely adjacent to the roadway remote control 2. A control circuit constructed in this manner shown in FIG. 2 will be used whenever the getting machine 4 is employed in a substantially inclined seam, where it operates unmanned and can be controlled only from the roadway or gallery. In this case, the getting machine must be supplied not only with the individual control commands via the cutter cable 1 but it must also be possible to check from the roadway whether the machine is ready to be switched ON. To this end battery-driven protective devices, for example thermal relays 27, are provided to measure the temperature of the motor winding of the driving motor of the getting machine or of the engine cooling water as well as the temperature of highly stressed bearings by means of a thermal sensing element 37 to provide information of the readiness of the getting machine 4 for being switched on before the roadway remote control 2 is engaged. Readiness for being switched ON must always be established before the machine 4 is started; in the absence of such readiness no energy will be supplied to the drive motor, not shown, of the getting machine.

In FIG. 2, the photo-electronic coupler 14 and the end element diode 15 coupled in the monitoring conductor 5 are bridged by a conductor branch or bridge circuit 28 in which two normally closed switches 29 and 30 are serially connected, and bridge diode 31 connected antiparallel to the end element diode 15, is serially connected in the bridge circuit between switch 30 and the monitoring conductor 5 behind the end element diode 15. Monitoring conductor 5 also contains a normally open switch 32 which is controlled by the relay 33 of the thermal relays 27 together with the normally closed switch 30 in the branch circuit 28. A conductor branch 34 in monitoring conductor 5 contains a normally closed switch 35 bridging the normally open switch 32. Switch 35 and switch 29, in the bridge circuit 28, are actuated by a common relay 36 which is controlled in response to current in the conductor 3. By contrast to the embodiment illustrated in FIG. 1, the switch 17, which bridges the resistor 12 of the monitoring conductor 5 in the same way as the ON-key switch 16, is closed together with the switch 10 by the relay 9 of the remote control 2.

The battery 22, connected to the conductor 3 and supplying the required energy to the integrator 21, is also provided in this control circuit. As in the circuit according to FIG. 1, the output signal of the photo-electronic coupler 14 causes the relay 25 to operate. The switch 24 of the relay 25 also closes the circuit 23 of the apparatus 26 in this embodiment.

The monitoring conductor 5 is energized when the ON-key switch 16 is operated. By means of the output signal of the light emitting diode 19, the phototransistor 20 of the photo-electronic coupler 14 then switches on the battery 22 which is also connected to the conductor 3 in this embodiment, i.e., to the electric means, but in addition to supplying the integrator 21 it also supplies the protective device 27 with the necessary operating voltage. Since the antiparallel-connected diode 31 of the bridge circuit 28 simulates a fault in the monitoring conductor 5, it follows that the relay 6 will not be energized unless the relay 33 is simultaneously operated by means of the output signal of the protective device 27 and the bridge circuit 28 is interrupted by switch 30. It is only when the getting machine 4 is ready for being switched ON that the protective device 27 delivers an output signal which energizes the relay 33 and the protective device delivers a signal to interrupt the bridge circuit 28, and simultaneously, by engaging the switch 32, it also bridges the switch 35 which is opened by the relay 36, which maintains its operating voltage, when the remote control 2 is energized.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A control circuit for voltage and/or phase dependent apparatus for underground mining equipment such as a getting machine or conveyor system wherein said mining equipment is connected through a cable to a power supply switch, monitoring conductor and monitoring relay remotely situated in the mine gallery, said control circuit including the combination of:
   a photo-electronic coupler responsive to current in said monitoring conductor for producing an output signal,
   a battery fed integrator stage receiving the output signal from said photo-electronic coupler for producing a control signal,
   an output relay energized in response to said control signal to control the connection between said power supply cable and said apparatus before operation of said supply switch,
   an ON switch serially coupled in said monitoring conductor between said monitoring relay and said photo-electronic coupler,
   a first normally open switch serially connected in said monitoring conductor to bridge said ON switch, and
   a first relay responsive to an operating voltage delivered by said cable to said apparatus for closing said first normally open switch.

2. The control circuit according to claim 1 wherein the combination further includes:
   battery fed means on said mining equipment to provide a protective test signal representative of readiness for operation of said mining equipment,
   a normally closed switch bridging said photo-electronic coupler in said monitoring conductor to inhibit production of said output signal, and
   relay means responsive to said protective test signal for opening said normally closed switch to enable production of the output signal by said photo-electronic coupler.

3. The control circuit according to claim 1 wherein the combination further includes:
   battery means switched ON in response to the output signal from said photo-electronic coupler for supplying operating current to said battery fed integrator stage.

4. The control circuit according to claim 1 wherein the combination further includes:
   battery fed means on said mining equipment to provide a protective test signal representative of readiness for operation of said mining equipment,
   relay means responsive to said protective test signal,
   an end element diode in said monitoring conductor to deliver current received from said photo-electronic coupler,
   a bridge circuit to said monitoring conductor coupled across said photo-electronic coupler and said end element diode, said bridge circuit including a bridge diode coupled antiparallel to said end element diode, said bridge circuit further including first and second normally closed switches serially connected with said bridge diode,
   a second normally open switch serially connected in said monitoring conductor between said first normally open switch and said photo-electronic coupler, said second normally open switch and said first normally closed switch in the bridge circuit being responsive to said relay means,
   a third normally closed switch serially connected in said monitoring conductor across said second normally open switch, and a second relay responsive to an operating voltage delivered to said apparatus to operate said second normally closed switch serially connected in said bridge circuit and said third normally closed switch.

5. The control circuit according to claim 4 wherein said battery fed means includes a thermal relay with a thermal sensing element to produce a temperature condition signal corresponding to the temperature of motor windings on the mining equipment, said temperature condition signal being delivered for energizing said relay means.

* * * * *